United States Patent [19]

Fish et al.

[11] 4,122,305

[45] Oct. 24, 1978

[54] DICTATING MACHINE CONTROL UNIT

[76] Inventors: Leonard A. Fish, 21 West Goethe, Chicago, Ill. 60601; Harvey A. Brodsky, 9440 Lincolnwood Dr., Evanston, Ill. 60203; Bruce Weitzel, 8315 Rte. 53, Woodridge, Ill. 60615

[21] Appl. No.: 389,341

[22] Filed: Aug. 17, 1973

[51] Int. Cl.² .......................................... H04M 11/10
[52] U.S. Cl. .................................. 179/6 E; 179/2 A; 179/100.1 DR
[58] Field of Search ...... 179/6 E, 100.1 R, 100.1 DR, 179/2 A

[56] References Cited

U.S. PATENT DOCUMENTS

| | | | |
|---|---|---|---|
| 2,800,531 | 7/1957 | Kobley | 179/6 E |
| 3,141,931 | 7/1964 | Zarouni | 179/6 E |
| 3,288,941 | 11/1966 | Langendorf et al. | 179/100.1 DR |
| 3,418,432 | 12/1968 | Bogg, Jr. et al. | 179/100.1 DR |
| 3,527,312 | 9/1970 | Dooley | 179/100.1 DR |
| 3,549,821 | 12/1970 | Langendorf et al. | 179/100.1 DR |
| 3,553,378 | 1/1971 | Alter | 179/6 E |
| 3,647,985 | 3/1972 | Langendorf et al. | 179/100.1 DR |
| 3,725,589 | 4/1973 | Golden | 179/100.1 DR |

FOREIGN PATENT DOCUMENTS 914,069 12/1962 United Kingdom .......... 179/100.1 DR

OTHER PUBLICATIONS

Voice/Burst Tone Detector, Maddox, IBM Tech. Disclosure Bulliten, vol. 14, No. 6, 11/71, pp. 1789-1790.

*Primary Examiner*—Raymond F. Cardillo, Jr.
*Attorney, Agent, or Firm*—Hill, Gross, Simpson, Van Santen, Steadman, Chiara & Simpson

[57] ABSTRACT

A dictating machine control unit includes apparatus connected to a telephone transmission line and adapted to respond to signals received over the telephone line for controlling the operating functions of a dictating machine, such signals being produced by operation of a telephone instrument, which may be either the coded tone type or the dial type. The apparatus responds to the detection of a ringing signal received over the transmission line for generating a guard tone and recording the same on a record medium to identify the beginning of a recording and to serve as a buffer, providing security for previously recorded messages. The functions of "record," "play back," "review," "stop," "correction mark," "end of letter mark," and "cell attendant" are controlled in response to touch tone signals or dial pulse signals generated by operation of the telephone instrument. Apparatus is provided to recognize a disconnect condition, initiated by an open circuit or a reverse voltage condition, or detection of a dial tone signal, for releasing the line, and to reset the apparatus for a subsequent recording following the end of the last recorded message. A voice-operated relay disables the forward drive of the dictating machine when no signal is being received over the transmission line.

4 Claims, 10 Drawing Figures

DICTATING MACHINE CONTROL UNIT

BACKGROUND

1. Field of the Invention

The present invention relates to apparatus for controlling remotely an electrically controlled device such as a dictating machine, and more particularly to such apparatus which is controllable by means of a telephone instrument over a telephone transmission line.

2. Prior Art

It is frequently desirable to remotely control apparatus such as a dictating machine or the like using an ordinary telephone line, with control signals originated by operation of a conventional telephone instrument, sometimes referred to herein as a telephone handset. Several attempts at accomplishing this have been made in the past, but such attempts have not met with unqualified success for a variety of reasons. In the first place, much of the apparatus heretofore known does not permit use of the dictating machine equipment remotely with the same facility and with the same full range of operating functions as are available when such equipment is operated manually by the operator in person, and is not suitable for use with a variety of different types or styles of dictating machines. Moreover, the apparatus of the prior art has not provided means for controlling the dictation machine entirely through the microphone cable jack or plug, but additional wiring changes within the dictating machine have also been necessary.

Further, such systems have heretofore been usable only with certain kinds of transmission lines and with certain kinds of handsets. This has limited the apparatus to use only under relatively restricted conditions, such as, for example, where the parameters of the transmission line are known with some precision, as are the amplitudes of the control signals, etc. These restrictions effectively prevent operation of the equipment via any telephone transmission line, such as long distance lines, etc., where the parameters cannot be known with precision because of variations from line to line.

The previously known systems have also not had a capability to operate in response to operation of either a coded tone handset or a dial type handset, and they are subject to faulty operation because of the vast difference between the level of control signals and sigals to be recorded, and the level of signals being played back.

The systems of the prior art have also been subject to faulty operation in response to spurious signals present on the transmission line, and do not adequately operate to release the transmission line in response to the presence of a dial tone on it.

SUMMARY OF THE INVENTION

It is a principal object of the present invention to provide apparatus for controlling the operation of a dictating machine by the use of a telephone handset over a telephone transmission line, which apparatus is not subject to the disadvantages of the previously known systems.

Another object of the present invention is to provide such apparatus in which the only required connection with the dictating machine is through the connection normally used for the microphone.

A further object of the present invention is to provide apparatus for automatically seizing a telephone transmission line in response to detection of a ringing signal, and for automatically releasing said line when a disconnect condition is detected in response to an open circuit on the line, a reverse voltage condition on the line, or the presence of a dial tone on the line.

Another object of the present invention is to provide a system of the type described incorporating modular construction so that the system is readily adapted for use with a variety of types of dictating machines.

A further object of the present invention is to provide apparatus adapted for use with either a touch tone handset or a dial type handset.

A further object of the present invention is to provide apparatus for distinguishing between control signals and spurious signals present on the transmission line.

Another object of the present invention is to provide dictating machine control apparatus which is adapted to produce a variety of operating signals for controlling the operation of a variety of different types of machines which may be connected therewith.

These and other objects of the present invention will become manifest upon an examination of the following description and the accompanying drawings.

In one embodiment of the present invention there is provided a dictating machine control unit adapted to control operation of a dictating machine connected therewith, said control unit comprising means for detecting a ringing condition on a telephone transmission line, means responsive to the ring detector for generating a guard tone for a predetermined time interval and for recording said guard tone on the recording medium of the dictating machine, means operative subsequent to the generation of said guard tone for receiving signals from the transmission line and recording them on the recording medium, and means responsive to control signals generated by either a coded tone handset or a dial type handset and transmitted over said transmission line for causing said dictating machine to execute an operational function.

In other embodiments of the present invention, the apparatus may be used to control operation of electrically controlled apparatus other than a dictating machine over a telephone transmission line, by means of signals generated by either a coded tone type or a dial type handset.

BRIEF DESCRIPTION OF THE DRAWINGS

Reference will now be made to the accompanying drawings in which.

Figure 1:
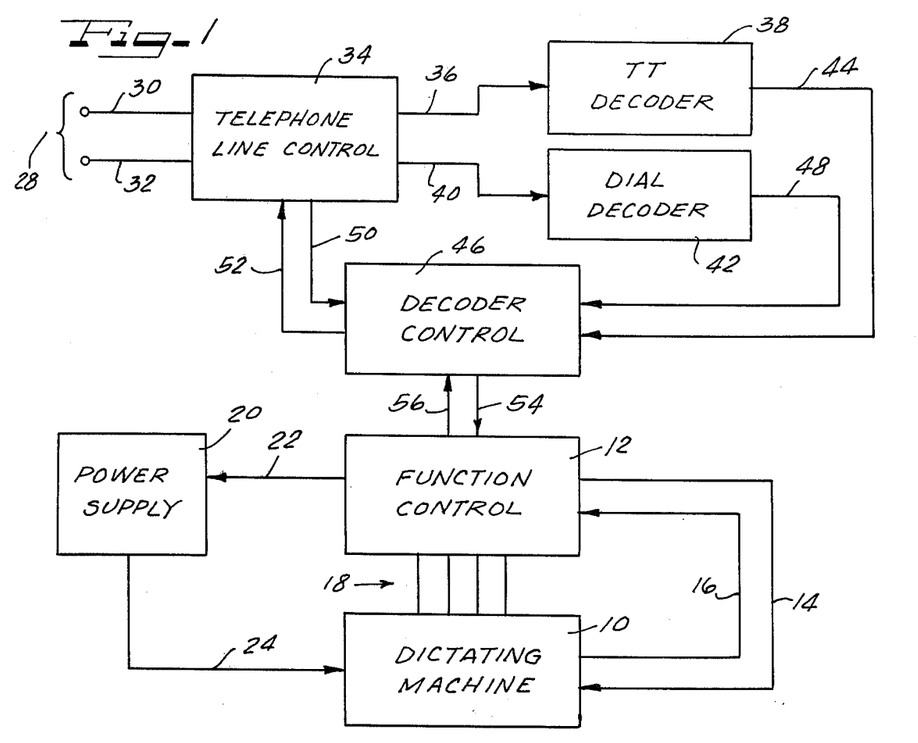
FIG. 1 is a functional block diagram of a control system incorporating an illustrative embodiment of the present invention.

Referring first to FIG. 1, a functional block diagram of a dictating machine control unit is illustrated, which incorporates an illustrative embodiment of the present invention. A dictating machine 10 is connected with the dictating machine control unit 12 by means of several separate lines. A line 14 furnishes a signal to be recorded from a function control unit 12, and a line 16 carries a signal previously recorded by the dictating machine 10 to the function control unit 12. A plurality of additional control lines 18 interconnect the function control unit 12 with the dictating machine 10, to cause the dictating machine 10 to execute all of its other functions, when desired. The lines 18 include individual lines for controlling all of the dictating machine functions, and the lines 14, 16, and 18 are connected to the machine 10 by means of the connector which ordinarily connects the machine with a hand-held control unit containing a microphone and several control switches. The hand-held control unit is not used when the present invention is employed.

A power supply unit 20, connected by a line 22 with the function control unit 12, supplies power to the dictating machine 10 over a line 24 when so controlled by the dictating machine control unit 12 by signals on the line 22.

A telephone transmission line is connected to a pair of input terminals 28 which are connected by lines 30 and 32 to the inputs of a telephone line control unit 34. The telephone line control unit 34 is responsible for seizing the telephone transmission line connected with the terminals 28, in response to detection of a ringing signal, and for releasing the line in response to detection of a disconnect condition. The telephone line control unit 34 operates to supply control signals over a line 36 to the input of a coded tone decoder unit 38, and over a line 40 to the input of a dial decoder unit 42. The touch tone decoder unit 38 responds to the presence of coded tone signals on the telephone transmission line connected with the terminals 28 to supply control signals over a line 44 to a decoder control unit 46.

The dial decoder unit 42 functions to detect and decode pulses on the transmission line connected with the terminals 28 generated by the dial of a dial type telephone handset and to furnish corresponding control signals to the decoder control unit 46 over a line 48. The decoder control unit 46 is connected by a pair of lines 50 and 52 with the telephone line control unit 34. Signals to be recorded by the dictating machine 10 are furnished over the line 50 to the decoder control unit 46 and are in turn furnished to the function control unit 12 by a line 54. In similar fashion, recorded signals played back from the dictating machine 10 are furnished from the function control unit 12 over a line 56 to the decoder control unit, and over the line 52 to the telephone line control unit 34. From the telephone line control unit 34, the play back signals are made available to the telephone transmission line connected with the terminals 28, so that previously recorded messages played back from the dictating machine 10 can be heard via the same telephone handset used for developing the control signals.

Typically, only one or the other of the decoder units 38 and 42 is employed at any given time. The dial decoder unit 42 is the subject of the application of Leonard Fish et al, filed concurrently herewith and entitled "Dial Pulse Detector and Method", now U.S. Pat. No. 3,927,264. The description of the dial decoder unit 42 embodied in such application is incorporated herein by reference. The dial decoder unit per se forms no part of the present invention, which can function equally well without a dial decoder (provided touch tone operation only is desired) or with any other dial decoder. Certain features of the present invention, however, are eminently well suited for cooperation with the dial decoder unit described in the aforesaid Fish et al application.

Figure 2:
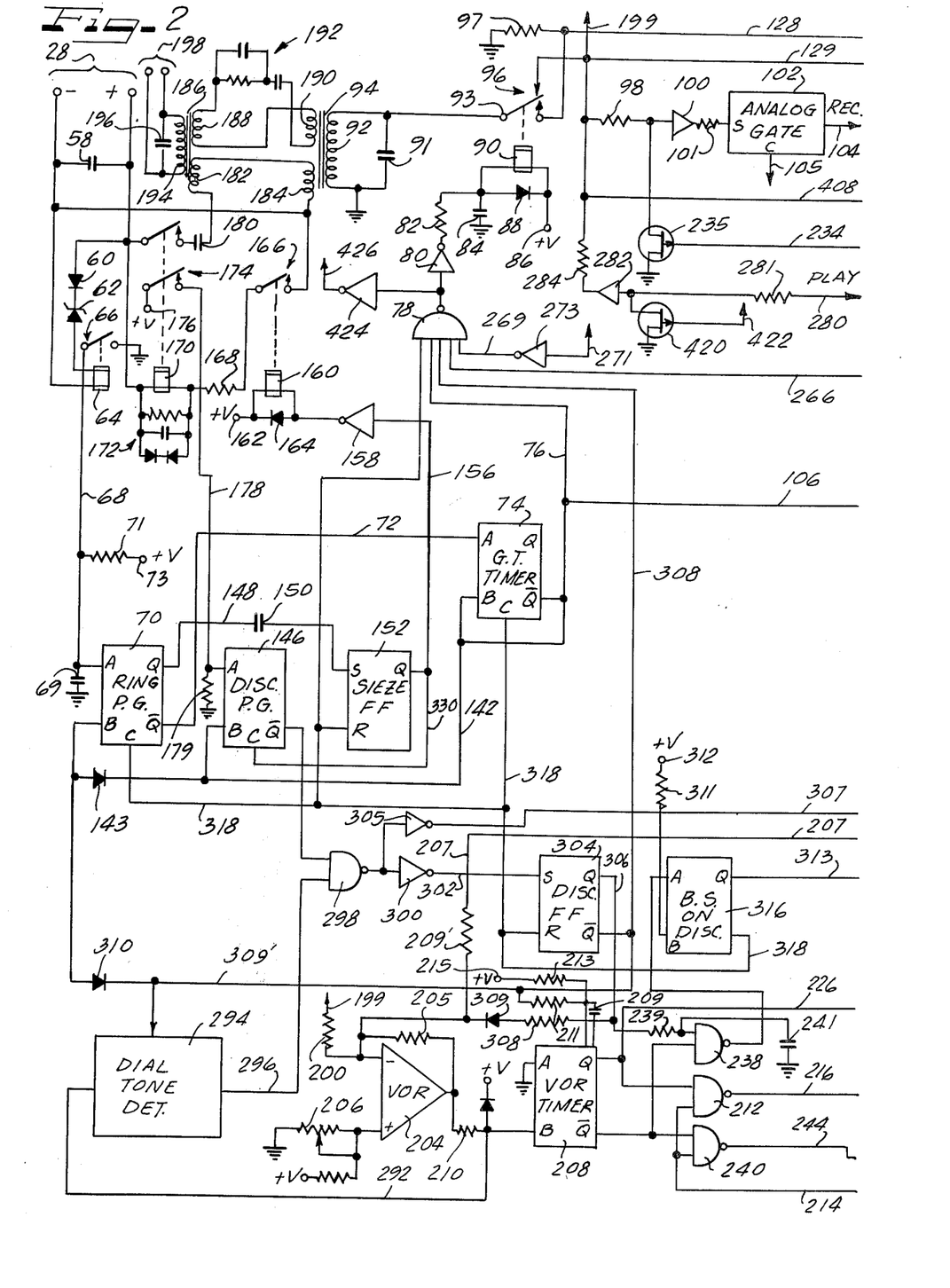
FIGS. 2 and 3, taken together, form a functional block diagram of a portion of the apparatus of FIG. 1.
Figure 3:
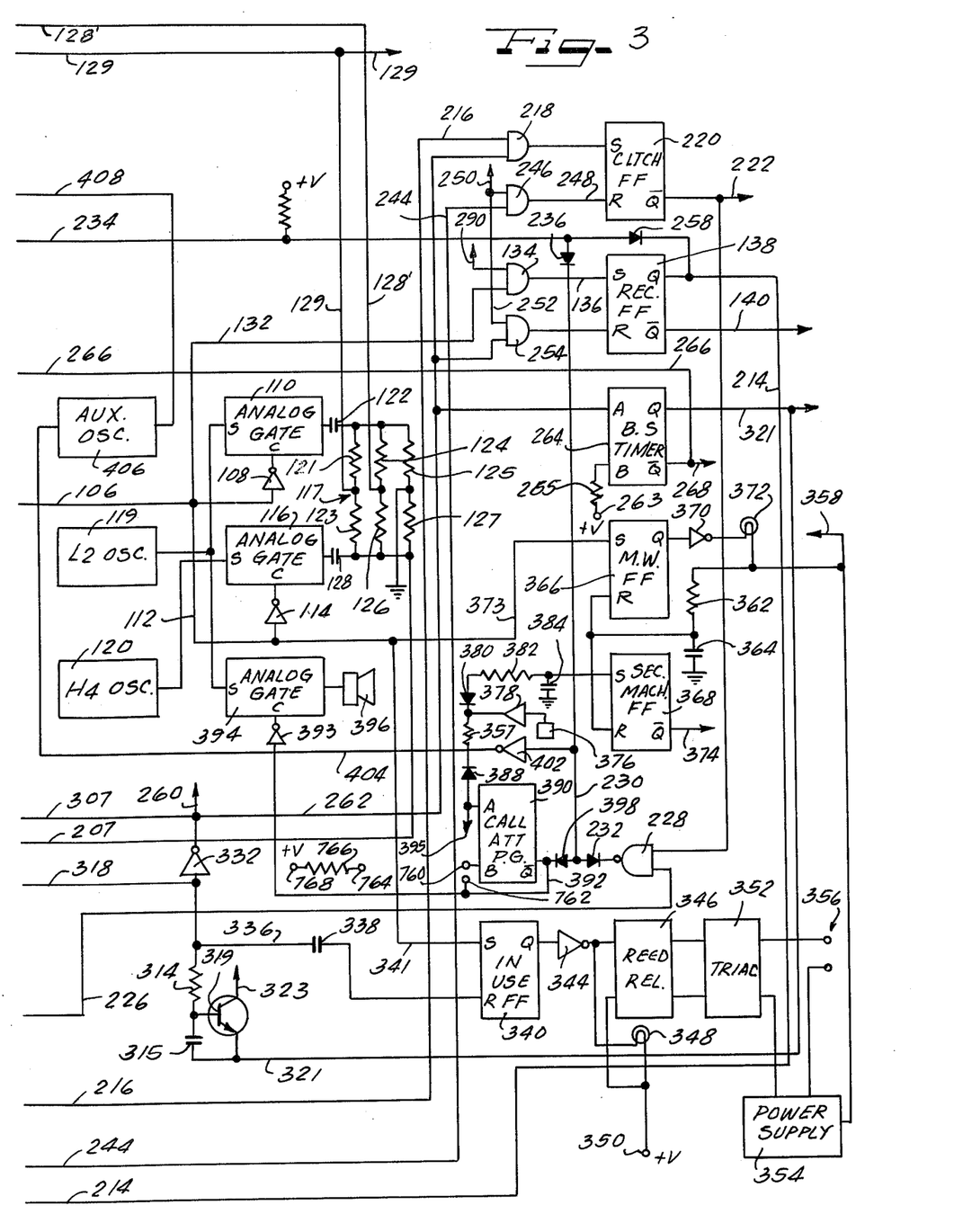

Referring now to FIGS. 2 and 3, a more detailed functional block diagram of a portion of the apparatus of FIG. 1 is illustrated. FIGS. 2 and 3 are drawn so that their various lines interconnect with each other when FIG. 3 is on the right-hand side of FIG. 2.

A capacitor 58 is connected across the terminals 28, and a ringing detector circuit is connected across the capacitor 58. The ringing detector circuit includes a diode 60, a zener diode 62, and a relay coil 64. The diode 60 rectifies the ringing current and the zener diode 62 drops the ringing voltage level, so that the difference between the input voltage and the zener voltage is applied to the relay coil 64. Thus, only a signal exceeding the zener voltage can actuate the relay coil 64. When a ringing signal is received, the relay coil 64 is operated to close contact 66, furnishing a ground potential to the line 68.

The line 68 is connected through a capacitor 69 to ground and to the A input of a monostable multivibrator 70 which functions as a ring pulse generator. The B input is normally high, to enable the ring detector 70 for operation as soon as the A input goes low. The A input is also normally high, being connected through a resistor 71 to a source of positive voltage at a terminal 73. When the contact 66 is closed, even momentarily, the ring pulse generator 70 is actuated to transfer from its stable state to its quasi-stable state, and produces a high level signal on its Q output and a low level signal on its $\overline{Q}$ output, reversing the levels on these outputs when in its stable state. The $\overline{Q}$ output is connected by a line 72 to the A input of a monostable multivibrator 74, which functions as a guard tone timer.

The timer 74 is actuated by the low level on the line 72, and produces a negative-going signal at its $\overline{Q}$ output.

The $\overline{Q}$ output of the timer 74 is connected to a number of places, to perform a variety of functions simultaneously. It is connected by a line 76 to one input of a NAND gate 78. The output of the NAND gate 78 is connected through an inverter 80 and through a series resistor 82 and capacitor 84 to ground. The junction between the resistor 82 and the capacitor 84 is connected to a source of positive potential at a terminal 86 through a diode 88, and a relay coil 90 is connected in parallel with the diode 88.

When the potential on the line 76 goes low, the potential at the output of the inverter 80 also goes low, and current is drawn through the relay coil 90, serving to cause the contacts 96 to change their condition from their normal (shown in FIG. 2) condition to their operated condition. The common terminal 93 of the contacts 96 is connected to one end of a winding 92 of a transformer 94, the other end being grounded. A capacitor 91 is connected in parallel with the winding 92. When the relay coil 90 is operated, the contacts 96 complete a circuit from the upper end of the winding 92 through the normally open contact 96, and from there through a resistor 97 to ground. Simultaneously, a circuit is opened, which normally connects the upper end of the winding 92 through a resistor 98 to an amplifier 100, and through the amplifier 100 and a resistor 101 to the input of an analog gate 102. The gate 102 furnishes on an output lead 104, when conditioned by a signal on a control line 105, signals which are furnished to the dictating machine as signals to be recorded. As a result of the relay coil 90 operating, therefore, the dictating machine is cut off from signals to be recorded which are derived from the transmission line by the transformer 94.

The $\overline{Q}$ output of the timer 74 is also applied over a line 106 through an inverter 108 to the control input of an analog gate 110, and through the lines 106 and 112 through an inverter 114 to the control input of an analog gate 116. The signal inputs of the two analog gates 110 and 116 are respectively connected to the outputs of a pair of oscillators 119 and 120, which are adapted to generate simultaneously two separate frequencies which together comprise a guard tone. The analog gates 110 and 116 pass the guard tone signal to an output network 117. The output network 117 incorporates a capacitor 112, a resistor 124, a resistor 126, and a capacitor 128 interconnected between the outputs of the gates 110 and 116. The junction of the resistors 124 and 126 is connected by a line 128 to the normally open contact 96, and from there to the winding 92 of the transformer 94. This supplies the guard tone to the transmission line, as described in more detail hereinafter, where it may be heard by the operator of the unit over a handset at a remote location.

The output network 117 includes a further pair of resistors 121 and 123 connected across the outputs of the gates 110 and 116, with their junction connected with a line 129. The line 129 is connected through the resistor 98 and the amplifier 100 to the analog gate 102. Accordingly, since the control input 105 is high at this time, the guard tone is passed through the analog gate 102 to be recorded on the recording medium of the dictating machine over the line 104. Two additional resistors 125 and 127 connect the outputs of the two gates 110 and 116 to ground. The valves of the resistors 121 and 123-127 are chosen to give signals of the proper amplitudes for recording and for transmission to the operator.

The $\overline{Q}$ output of the timer 74 is also connected by a line 132 to an input of an AND gate 134, the output of which is connected over a line 136 to the set input of a flip-flop which functions as the record flip-flop. The record flip-flop 138 thereupon produces a low level at its $\overline{Q}$ output, connected to a line 140 which is adapted to place the dictating machine in its record mode, for recording the guard tone applied to the line 104. The line 140 is one of the control lines 18 shown in FIG. 1.

The $\overline{Q}$ output of the timer 74 is also connected over a line 142 to the B input of a monostable multivibrator 146, to disable it during the period of the guard tone timer 74. The multivibrator 146 functions as a disconnect pulse generator, as described hereinafter. This prevents the multivibrator 146 from operating before the guard tone timer 74 has completed its cycle.

The line 142 is also connected to the B input of the timer 74 to prevent it from being retriggered, so the time of residence of the timer 74 in its quasi-stable state cannot be extended. The line 142 is also connected through a diode 143 to the B input of the ring detector 70, to also prevent it from being retriggered during operation of the timer 74.

When the ring pulse generator 70 times out, after 3 seconds, its $\overline{Q}$ output goes high and its Q output goes low. The Q output is connected over a line 148 through a capacitor 150 to the set input of an R S flip-flop 152, and the negative-going portion of the signal from the Q output of the detector 70 causes the flip-flop 152 to be set. The Q output of the flip-flop 152 goes high, and a high level is connected over a line 156 to an inverter 158. The output of the inverter 158 is connected through a coil 160 to a source of positive potential applied to the terminal 162. A diode 164 is connected in parallel with the coil 160.

The flip-flop 152 functions as a seize flip-flop, to seize the line when it is set. Setting the seize flip-flop 152 causes the coil 160 to be energized in response to the timing out of the ring pulse generator 70, and the contacts 166 associated with the coil 160 are thereby closed. This completes a circuit through the contact 166 from one of the terminals 28 through a resistor 168 and through a coil 170 to the opposite side of the line. A network 172, including a diode, a zener diode, a capacitor, and a resistor, is connected in parallel with the coil 170. The zener diode of the network has a zener voltage just in excess of the operating voltage of the coil 170, to render the coil 170 more sensitive to a momentary opening of the circuit of the transmission line, on disconnect.

Closing of the switch 166 actuates the coil 170, and its contacts 174 comprise a double-pole single-throw switch. One pole of the switch 174 connects a positive potential, present at a terminal 176, to a line 178 which is connected to ground through a resistor 179 and to the A input of the disconnect pulse generator 146 and conditions the same for operation when the coil 170 is deactuated. The other pole of the switch 174 connects one side of the line through a capacitor 180 and through windings 182 and 184 back to the other side of the line. The winding 184 is associated with the transformer 94 and the winding 182 is associated with a corresponding transformer 186. Two additional windings 188 and 190 are provided for the transformers 186 and 94, respectively, and they are interconnected in series with a circuit 192 incorporating a pair of capacitors and a resistor. The circuit 192 is provided for balancing the circuit including the transformers 94 and 186.

One additional winding 194 is provided on the transformer 186, and a capacitor 196 is connected in parallel therewith. The winding 194 is connected to terminals 198, which are connected to the dial decoder unit, and functions to furnish dial pulses present at the input terminals 28 to the dial decoder unit. The coded tone decoder unit is connected to the line 129, as described in more detail hereinafter. The relay coil 170 remains energized as long as the line connected to the terminals 28 remains seized. If this line should open, however, the relay coil 170 becomes de-energized and the contacts 174 open. This causes the disconnect pulse generator 146 to go into its quasi-stable state and to initiate a disconnect cycle.

When the guard tone timer 74 times out, after about 7 seconds, the output at the $\overline{Q}$ output of the timer 74 goes high. This causes the potential on the line 106 to go high, thus disabling the gates 110 and 116. Accordingly, although the oscillators 119 and 120 continue to function, their outputs are no longer connected to the line 128 by the analog gates 110 and 116. The potential on the line 132 also goes high, but this does not affect the state of the flip-flop 138, which remains set and remains in its "record" condition. The potential on the line 76 goes high, so that the output of the inverter 80 also goes high, and the coil 90 is de-energized. Accordingly, the normally closed contacts 96 are again closed, and the coil 92 is connected to the line 129, and through the amplifier 100 to the gate 102. The line 142 also goes high, but this does not cause any further operation.

Once the telephone transmission line is seized, and the dictating machine placed in its record condition by virtue of the output on the line 140, messages may be transmitted to the machine for recording over the line 104.

The normally closed contact of the switch 96 is connected through a line 199 and a resistor 200 to the inverting input of an operational amplifier 204, which functions as a VOR (or voice-operated relay) amplifier. The noninverting input is connected by rheostat 206 to ground. The rheostat 206 is adjustable to compensate for the offset of the amplifier 204. The output of the VOR amplifier 204 is connected to its input by a feedback resistor 205, and the B input of a monostable multivibrator 208 through a resistor 210. The multivibrator 208 functions as a VOR timer unit, and is retriggerable by positive-going signals to maintain the timer 208 in its quasi-stable state as long as a signal is present at the output of the amplifier 204. It has a time period of about three seconds, established by a capacitor 209, and two resistors 211 and 213. The capacitor 209 is connected across two terminals of the multivibrator 208, and the resistor 213 is connected from one terminal of the capacitor 209 to a source of positive potential at a terminal 215. The resistor 211 is connected to the $\overline{Q}$ output of a flip-flop 304, which is normally high, except when a disconnect sequence is being performed. A resistor 209', connected by a line 207 between the input of the VOR amplifier 204 and the output of the gate 116, keeps the VOR on during generation of the guard tone.

The Q output of the multivibrator 208 is connected to one input of a NAND gate 212, the other input of which is connected over a line 214 to the Q output of the flip-flop 138, which output goes high when the record flip-flop 138 is set. The output of the NAND gate 212 is connected by a line 216 to one input of an AND gate 218, the output of which is connected to the set input of an R S flip-flop 220, which functions as a clutch flip-flop. The $\overline{Q}$ output of the clutch flip-flop 220 is connected to a line 222 and the line 222 is connected with the dictating machine via one of the line 18 (FIG. 1), to control the clutch of the dictating machine. The clutch is operated whenever the level on the line 222 is low. Accordingly, as long as the VOR timer multivibrator 208 remains in its quasi-stable state, and the record flip-flop 138 is set, the clutch of the dictating machine remains energized by virtue of the signal present on the line 222.

The Q output of the multivibrator 208 is also connected by a line 226 to one input of a NAND gate 228, the other input of which is connected to the line 222. The NAND gate 228 thus produces a low level at its output when the clutch flip-flop 220 is in its reset state, so as to produce a high level signal on the output 222, and the multivibrator 208 is in its quasi-stable state. The output of the NAND gate 228 is connected to a line 230 through a diode 232, and the line 230 is connected to a line 234 through a diode 236. The diodes 232 and 236 are poled so as to cause current to be drawn from the line 234 when the gate 228 is operated. The line 234 is connected to the gate of a field effect transistor (or FET) 235, the source and drain terminals of which are connected across the input of the amplifier 100. When current is drawn from the gate of the FET 235, the FET becomes conductive, and short-circuits the inputs of the amplifier 100, thus greatly attenuating and muting signals applied to the analog gate 102 through the amplifier 100, which are supplied to the dictating machine for recording by the line 104.

The $\overline{Q}$ output of the timer 208 is connected to one input each of two NAND gates 238 and 240. The second input terminal of the NAND gate 238 is connected to the Q output of the disconnect flip-flop 304, via a delay circuit including a resistor 239 and a capacitor 241. The Q output of the disconnect flip-flop 304 is normally at a low potential, so that the NAND gate 238 remains unactuated. The second input of the NAND gate 240 is connected to the line 214, so that the gate 240 is actuated when the timer 208 times out, as long as the record flip-flop 138 remains set. This produces a low potential on an output line 244, which is connected to one input of an AND gate 246. The gate 246 then produces a low level signal on its output line 248, which is connected to the reset terminal of the clutch flip-flop 220. Accordingly, the clutch of the machine is deactuated via the line 222 whenever a pause in a message exceeds the quasi-stable period of the VOR timer 208, which is about three seconds. Resumption of signals to be recorded immediately returns the VOR timer 208 to its quasi-stable state, resetting the flip-flop 220 via line 216 and re-energizing the clutch of the recording machine via the line 222.

While the line is connected to the control unit, the operator may select a variety of options by dialing certain specific digits, either by using a dial type handset or a touch tone type. In either case, the control signals are detected by the decoder units 38 and 42 (FIG. 1), and signals are applied thereby to various lines of FIGS. 2 and 3. For example, the operation of the dictating machine may be stopped in response to the pushing of the "4" button on a touch tone telephone handset or dialing the digit "4" on a dial type handset. This causes a low level signal to be produced on a line 250, connected to an input of the AND gate 246, and simultaneously on a line 252, connected to one input of an AND gate 254. The gate 246 is connected to the reset input of the clutch flip-flop 220, and the gate 254 is connected to the reset input of the record flip-flop 138. Accordingly, both the clutch flip-flop 220 and the record flip-flop 138 are reset in response to decoding of a "4" digit.

A diode 258 interconnects the Q output of the flip-flop 138 with the line 234, so that the FET 235 is rendered conductive whenever the record flip-flop 138 is reset. This mutes signals applied to the analog gate 102 by the amplifier 100 when recording is not desired. It is also desirable to mute control signals whenever they appear at the input of the amplifier 100, so as to avoid spurious control signals during playback of the recorded signals. If a touch tone "4" signal were recorded, for example, the system would respond by stopping during playback of that portion of the record, instead of making an uninterrupted playback. Therefore, a low level signal is made available on the line 105, connected to the control input of the analog gate 102, whenever a control signal is detected. This inhibits operation of the gate, with the result that no signal appears on the output line 104, and the control signals are not recorded. The source of the signal on the line 105 is described hereinafter in connection with FIG. 5.

Another control function which the operator may select by use of a telephone handset is a backspace function, which is selected either by depressing the "2" button of a touch tone handset, or by dialing "2" on a dial type handset. In either event, a low level signal is produced on a line 260, which is connected through a line 262 to one input of the AND gate 254 and to one input of the AND gate 218. The gates 254 and 218 function to reset the record flip-flop 138 so that recording ceases, but to engage the clutch of the dictating machine by setting the clutch flip-flop 220, if it was not set already. The line 262 is also connected to the A input of an monostable multivibrator 264, which functions as a backspace timer. The B input of the timer 264 is connected to a positive source of potential at a terminal 263 through a resistor 265. The $\overline{Q}$ output of the timer 264 is connected to a line 266, which is in turn connected to one input of the NAND gate 78, so that the gate 78, which is normally actuated, becomes de-actuated in response to the low level on the line 266 when the timer 264 switches to its quasi-stable state in response to the low level on the line 262. The relay coil 90 is then actuated, and the contacts 96 shift to their operated positions. The winding 92 is thus disconnected from the recording amplifier 100.

The timer 264 also produces a low level output on the line 268, which is connected to the dictating machine via one of the lines 18 (FIG. 1), and controls the backspace function thereof. The period of the timer 264 is such as to cause the dictating machine to backspace its recording medium by an interval equivalent to about six seconds of normal running time of the recording medium. The period of the timer 264, in order to accomplish this, varies with the specific dictating machine with which it is to be used, as some dictating machines have more rapid-acting backspace systems than others. Accordingly, the period-determining components (not shown) of the timer 264 are selected to make the timer especially adapted for use with the particular dictating machine being used.

The gate 78 is therefore not actuated by advancing the transport mechanism of the dictating machine past the area where the guard tone is recorded. In many dictating machines, the clutch is automatically re-energized following a backspace control function, and the machine is automatically placed in its playback mode. In other machines, the clutch must be disabled during backspacing, and re-engaged when the backspacing is complete. Either type of machine can be accommodated by the present invention, as described in more detail with reference to FIG. 6.

When the backspace timer 264 times out, it restores a high level to the line 266 to energize the gate 78. If a guard tone is being detected by the touch tone detector at this time, however, indicating that the backspace has carried back into the area in which the guard tone was recorded, the gate 78 remains de-actuated by a low signal present on a line 269, in response to a high level on an input line 271, supplied to an inverter 273, the output of which is connected to the line 269.

The playback output of the dictating machine is received on a line 280 and is connected through a resistor 281, an amplifier 282, and a resistor 284 to the line 129, which is connected to the input of the touch tone detector. Accordingly, the guard tone, which is detectable by the touch tone detector, is readily detected if the backspace is carried into the guard tone area.

When the guard tone ceases, the relay coil 90 is again de-energized, connecting the winding 92 to the dictating machine via the gate 102. It is important that the transmission line be maintained disconnected from the system during the time that the guard tone is being detected, following backspacing, to avoid the possibility of an operator issuing another backspace control signal which may result in backspacing beyond the guard tone, which would enable the operator to gain access to a recording made by a previous connection with the telephone transmission line. As the guard tone is seven seconds in length, and the backspace control is adjusted for six seconds of machine running time, a single backspace cannot carry the record medium beyond the guard tone, and the system is insensitive to a backspace command until after the guard tone area has been passed.

The resistors 125 and 127 function to prevent signals from the line from reaching the decoder circuits when the relay coil 90 is energized.

The operator may place the system into its record mode, subsequent to backspacing or subsequent to a stop command, by depressing the touch tone "3" button, or by dialing "3" with a dial type handset. When this is done, a low level signal is produced on a line 290 connected to one input of the AND gate 134, producing a low level output on the line 136 which sets the record flip-flop 138. The dictating machine is then returned to its record mode by a low level signal on the line 140, and a new message is recorded on the record medium, replacing previously recorded material.

The operator may disconnect the system of FIGS. 2 and 3 from the telephone transmission line by hanging up his handset, whereupon a short disconnect pulse is produced and communicated to the control unit over the transmission line, deenergizing the relay coil 170. If for any reason the relay coil 170 does not become deenergized, a dial tone appears on the transmission line after a few moments. The dial tone is applied to the terminals 28. The dial tone passes through the transformer 94 to the line 199, and through the VOR amplifier 204 and the resistor 210 to an output line 292, connected from the output of the VOR amplifier 204 to the input of a dial tone detector unit 294. The dial tone detector unit 294 is sensitive to the frequencies of signals applied thereto, and produces an output on the line 296 when a signal having the frequencies of a dial tone is detected for a period of three seconds. The line 296 is connected to one input of a NAND gate 298, the other input of which is connected to the $\overline{Q}$ output of the disconnect pulse generator 146. The $\overline{Q}$ output of the generator 146 is normally high, as is the output on the line 296, so that when the line 296 goes low, the output of the NAND gate 298 goes high, and the output of an inverter 300, which is connected thereto, goes low. The output of the inverter 300 is connected by a line 302 to the set input of the flip-flop 304, which functions as the disconnect flip-flop. When it is set, its Q output goes high, applying a high potential to a line 306. The line 306 is connected through resistor 308 and a diode 309 to the input of the VOR amplifier 204. The valve of the resistor 308 is such as to desensitize the VOR amplifier 204, so that only relatively high amplitude signals (such as the playback of a recorded material) is effective to retrigger the timer 208. This enables the timer 208 to time out when, on playback of the last portion of the recorded material, the high amplitude signals cease, and any noise, such as tape hiss and the like produced by the dictating machine on playback, does not prevent time out of the timer 208.

The output of the gate 298 is also connected by an inverter 305 to a line 307, which is connected to the line 262. A low level signal on the line 262, as described above, resets the record flip-flop 138, sets the clutch flip-flop 220, and triggers the backspace timer 264, to initiate a backspace of the dictating machine, and a subsequent playback of the recorded material.

The Q output of the disconnect flip-flop 304 is connected from the line 306 through a delay circuit including the resistor 239 and the capacitor 241 to one input of a NAND gate 238, the other input of which is connected to the $\overline{Q}$ output of the VOR timer 208. The delay circuit functions to delay slightly the signal appearing on the corresponding input of the gate 238, to allow the timer 208 to be triggered to its quasi-stable state by the material played back after backspacing, as a result of the high level output of the gate 298. Therefore, the gate 238 is not operated until the timer 208 times out following playback of the end of the recorded material, even if the machine is in its stop mode, with the VOR timer 208 having timed out, when the disconnect sequence is begun.

The $\overline{Q}$ output of the flip-flop 304 is connected by a line 308 to an input of the gate 78. The line 308 goes low when the flip-flop 304 is set, so the gate 78 is de-actuated, resulting in actuation of the relay coil 90, and shifting of the contacts 96 to the operated position, resulting in disconnection of the line 129 from the winding 92. Therefore, no control signals are presented to the touch tone detector during the time that the disconnect flip-flop is set. The $\overline{Q}$ output is also connected by the resistor 211 to a timing terminal of the VOR timer 208. When the $\overline{Q}$ output goes low, there is less current injected into the timing circuit of the timer 208, and so its time of residence is its quasi-stable state is extended. The values of the resistors 211 and 213 are chosen so that the period of the timer 208 is extended from about three seconds to about three and one-half seconds when the flip-flop 304 is set, so that any silent periods of about three seconds each during playback, caused by time out of the timer 208 during recording, do not cause the timer 208 to time out during playback following setting of the disconnect flip-flop 304.

The $\overline{Q}$ output of the flip-flop 304 is also connected by a line 309' and a diode 310 to the B input of the ring detector 70, to prevent the ring detector 70 from triggering while the flip-flop 304 is set. The line 309' is also connected to a clear point input of the dial tone detector 294 to inhibit further operation.

When the VOR timer 208 times out, the clutch flip-flop 220 is reset by operation of the NAND gate 240 and the AND gate 246, and the NAND gate 238, previously conditioned by the Q output of the flip-flop 304, is also actuated. The output of the gate 238 is applied to the A input of a multivibrator 316, the B input of which is connected to a source of positive potential at a terminal 312 by a resistor 311. The multivibrator 316 functions as a backspace timer. The $\overline{Q}$ output of the timer 316, which goes low when the timer 316 is triggered, is connected to the reset input of the disconnect flip-flop 304 by a line 318. The line 318 is also connected to the clear input of the guard tone timer 74, to the clear input of the ring detector 70, to the reset input of the flip-flop 152, and to an input of the NAND gate 78. Accordingly, the ring detector 70 and the guard tone timer 74 are each reset, as is the seize flip-flop 152. The relay 90 continues to be actuated by operation of the gate 78, even though the flip-flop 304 has been reset. The relay coil 160 is de-actuated when the Q output of the seize flip-flop 152 goes low, thus opening the contacts 166 and de-actuating the relay coil 170. This releases the line by opening the contacts 174.

The Q output of the seize flip-flop 152 is also connected over a line 330 to the clear input of the disconnect pulse generator 146, to reset it in the event that is was in its quasi-stable state.

The Q output of the timer 316 is connected over a line 313 to an inverter 332, the output of which is connected to the line 262, thus initiating a further backspacing operation.

The further backspacing function carries the record medium of the dictating machine back about six seconds of running time, or about two and one-half seconds prior to the end of the recorded material (the subsequent three and one-half seconds being blank because of the operation of the timer 208).

The line 313, which goes high when the timer 316 is triggered, is also connected, via a delay circuit including a resistor 314 and a capacitor 315, to the base of an npn transistor 319, the emitter of which is connected by a line 321 to the Q output of the timer 264, and the collector of which is connected by a line 323 to the dictating machine, the line 323 being one of the ine 18 (FIG. 1). The transistor 319 is rendered conductive when the timer 264 times out, at the end of the further backspace, the timer 316 remaining actuated at that time. The delay circuit including the resistor 314 and the capacitor 315 prevents operation of the transistor prior to triggering of the timer 264 by the timer 316. When the transistor 319 conducts, current is drawn from the line 323, and this causes the dictating machine to make an end-of-letter mark. The line 323 may also be driven to a low potential, to make an end-of-letter mark, by detection of a "7" digit, in response to the operator producing a "7" signal with his handset, but the end-of-letter made during the disconnect sequence is produced automatically.

Following the further backspacing, the dictating machine again enters its playback mode, as the clutch flip-flop 220 is set by the AND gate 218. The period of the timer 316 is selected to permit the playback to continue for about three seconds following the backspacing, and this three second period is enough for the record medium of the dictating machine to be advanced just beyond the end of the recorded material. Then the timer 316 times out, and its Q output goes low.

The Q output of the timer 316 is connected to a ine 336 while is connected through a capacitor 338 to the reset input of a flip-flop 340. The flip-flop 340 functions as an in-use flip-flop, designating that the machine is in use whenever it is in its set state. It is set at the time the guard tone is produced, by a low level on the lines 106 and 112, communicating with the set input by a line 341.

Its Q output is connected through an inverter 344 to an input of a reed relay 346, and also through the inverter 344 and a lamp 348 to a source of positive potential applied to a terminal 350. The opposite input of the reed relay 346 is also connected to the terminal 350, so the relay 346 is operated whenever the flip-flop 340 is in its set state.

When the flip-flop 340 is in its set state, the output c the inverter 344 is low and the lamp 348 is energized, to show an attendant that the machine is in use. The relay 346 is connected in circuit with the gate of a triac 352 which is adapted to close a circuit for applying line voltage to the power input of the connected dictating machine via a pair of power input terminals 356. The power supply 354 applies a constant source of potential to the apparatus of FIGS. 2 and 3 whenever it is switched on by a line switch (not shown) via a line 358. The triac circuit may be any known type, and the contacts of the reed relay 346 may be connected at any convenient place in the gate circuit for the triac.

The line 358 is connected through a resistor 362 and a capacitor 364 to ground. The circuit including the resistor 362 and the capacitor 364 functions as an integrator or delay circuit, for the purpose of applying the positive potential on the line 358 to the reset inputs of two flip-flops 366 and 368 a short time after the power supply 354 is first actuated (when positive potentials are applied to the set inputs of the flip-flops). The flip-flops 366 and 368 are thus placed in their reset states when the power supply 354 is first energized. The flip-flop 366 functions to indicate that a message is waiting. Its Q output is passed through an inverter 370 to one terminal of an indicator lamp 372, the other terminal of which is connected to the line 358, so the lamp is energized when the flip-flop 366 is set. Illumination of the lamp 372 indicates that the unit has received a call over the transmission line and that a message is waiting to be transcribed, having been recorded by the dictating machine. The flip-flop 366 is set by a low level signal on the line 112, which is connected to the set input of the flip flop 366 by a line 373.

The flip-flop 368 functions as a second machine flip-flop and produces a low level output on a line 374 when the recording medium of the first machine is exhausted. When the flip-flop 368 is set, control passes to a second dictating machine, so that further messages can be received and recorded. This flip-flop is set in response to a buzzer sounded by the dictating machine to indicate that its recording medium is nearly exhausted.

Operation of the buzzer is detected by a coil 376, placed under or near to the dictating machine, so as to detect the magnetic field generated by operation of the buzzer coil. The signal produced by the coil is amplified by an amplifier 378 and rectified by means of a diode rectifier 380 connected in circuit with a resistor 382 and a capacitor 384. Accordingly, a negative potential appears across the capacitor 384 whenever a signal is detected by the coil 376. The capacitor 384 is connected to the set input of the second machine flip-flop 368, to set it whenever a signal is generated by the coil 376 which is long enough to charge the capacitor 384 sufficiently to set the flip-flop 368. The time constant of the circuit including the resistor 382 and the capacitor 384 is sufficiently long so that response of the detection coil to stray magnetic fields does not trigger the flip-flop 368.

The output of the amplifier 378 is also connected through a resistor 357 and a diode 388 to the input of a monostable multivibrator 390, which functions as a call-attendant pulse generator. It produces a low level at its $\overline{Q}$ output, which is connected to the line 230 via a diode 398 to mute the recording amplifier 100, while it is in its quasi-stable state. The $\overline{Q}$ output of the pulse generator 390 is also connected by a line 392 and an inverter 393 to the control input of an analog gate 394, the signal input of which is connected to the output of an oscillator 119. The output of the gate 394 is connected to a loud speaker 396, so that during the period of the pulse generator 390, the oscillator 119 is connected to energize the loud speaker 396. This produces an audible tone which an attendant present at the location of the dictating machine can hear, so that steps can be taken to switch to a second machine manually, if not accomplished automatically. Because of the operation of the FET 235, the signal of the generator 119 is not recorded by the dictating machine.

The line 230 is also connected through an amplifier 402 to a line 404 which is connected to an auxiliary oscillator 406. The output of the auxiliary oscillator 406 is connected by a line 408 to the line 199, which is connected to the winding 92 of the transformer 94, so that the operator at the remote location can hear the tone generated by the oscillator 406, although this is not recorded on the tape because of the muting effect of the FET 235.

As a result of the muting by the FET 235, the signal applied to the VOR amplifier 204 is reduced, causing the VOR timer 208 to time out after three seconds, de-energizing the clutch of the dictating machine. Therefore, the dictating machine is brought to a stop as soon as the recording medium is exhausted.

The call-attendant pulse generator 390 may be operated independently of the end of recording medium condition, by the operator's producing a "O" signal with a telephone handset. When a "O" is decoded by one of the decoders, a line 395 goes low. The line 395 is connected to the A input of the pulse generator 390, but the diode 388 blocks operation of the second machine flip-flop 368. When operated, the pulse generator 390 is triggered to its quasi-stable state for its period, approximately one second, and the loudspeaker 396 is sounded. The attendant may then pick up a handset (not shown) connected to the same telephone line, to communicate verbally with the operator.

The disconnect sequence described above was initiated by an operator hanging up, causing a dial tone. A disconnect sequence is also initiated when the line opens for any reason, causing the de-energization of the relay coil 170, and opening the contacts 174. The opening of the circuit between the terminal 176 and the A input of the disconnect pulse generator 146 triggers the generator 146 and causes its $\overline{Q}$ output to go low, thereby de-actuating the gate 298 and initiating a disconnect sequence, as described above.

The FET 235 has been described above as muting operation of the recording amplifier under certain conditions. Playback is also muted under other conditions, and an FET 420 is provided for this purpose. The drain and source terminals of the FET 420 are connected from the input of the amplifier 282 to ground, and the gate of the FET 420 is connected to a line 422. The line 422 goes low when playback is to be muted, as described hereinafter.

When the NAND gate 78 is de-actuated, the relay coil 90 is energized, to shift the position of the contacts 96 and remove the coil 92 from the line 129, to disable the coded tone decoder connected thereto. This does not result in disabling of the dial decoder, because the dial decoder is connected to the terminals 198, via the transformer 186. Apparatus for disabling the dial decoder is provided, however, in the form of an inverter 424, having its input connected to the output of the gate 78, and having its output connected to a line 426. When the gate 78 is de-actuated the line 426 goes low to disable the dial decoder, as described hereinafter.

In order to avoid faulty operation, it is desirable to have the circuit including the transformers 94 and 186 balanced as precisely as possible. To that end, the balancing circuits 192 and 172 may be adjusted in accordance with the individual characteristics of each set of transformers and to a particular telephone line to which the device is connected, to achieve as little coupling as possible between the windings 92 and 194.

Figures 5, 6:
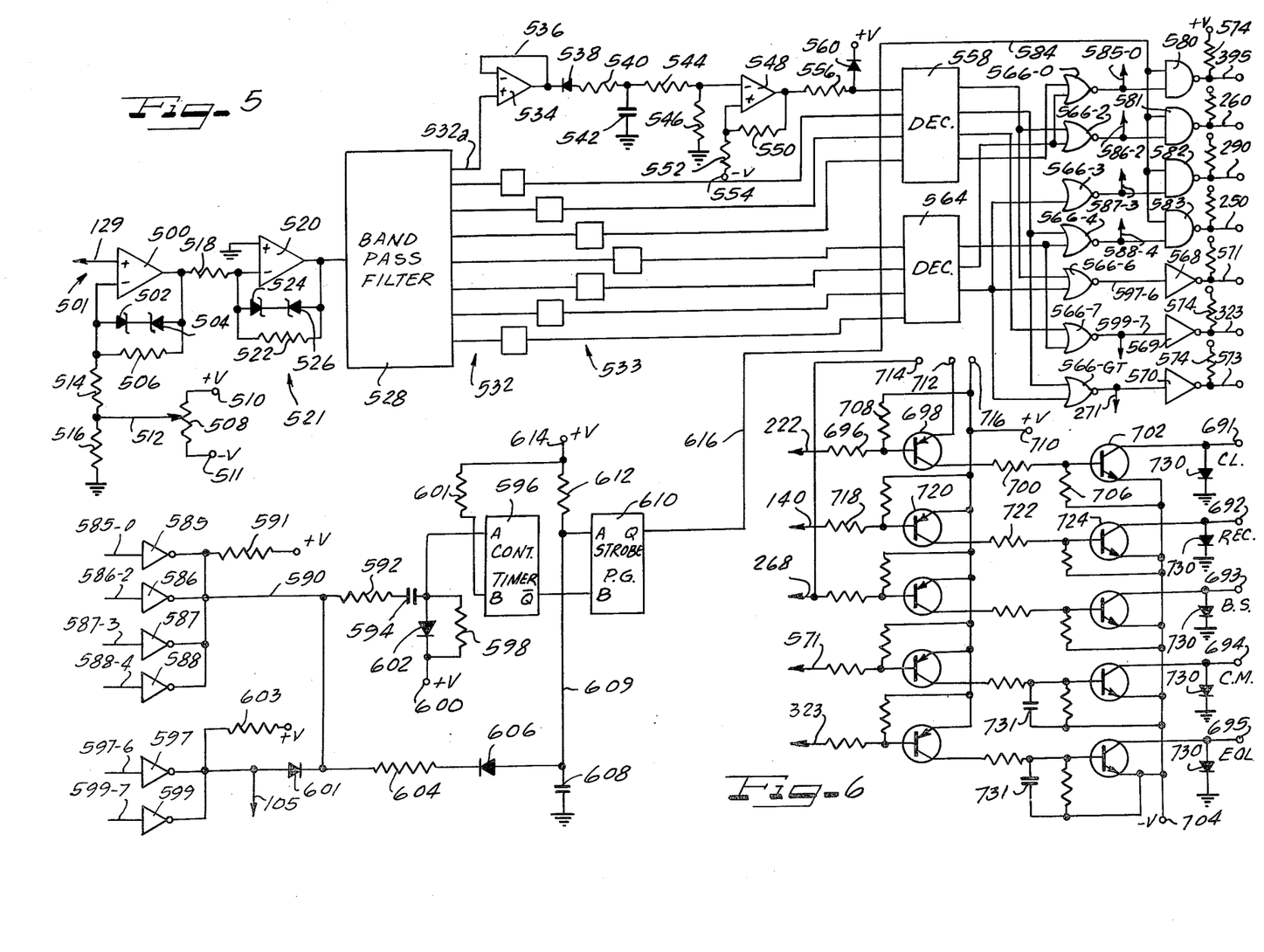
FIG. 5 is a functional block diagram of the touch tone decoder of FIG. 1.
FIG. 6 is a schematic circuit diagram showing an output system employed with a preferred embodiment of the present invention.

In FIG. 5, a schematic diagram of the coded tone detector is illustrated. The line 129 is connected to the noninverting input of an operational amplifier 500, functioning as a first limiter. A feedback circuit 501 is connected between its output and its inverting input. The feedback connection comprises a pair of matched zener diodes 502 and 504, connected in opposing relationship, and a resistor 506 connected in parallel therewith. The inverting input is supplied with a bias potential, derived by a potentiometer 508 connected between sources of positive and negative potential at terminals 510 and 511. The tap of the potentiometer 508 is connected through a line 512 to ground by a resistor 516. The output of the operational amplifier 500 is connected by a resistor 518 to the inverting input of a second limiting operational amplifier 520, the noninverting input of which is grounded. The resistor 518 sets the gain of the limiting circuit. A feedback network 521 is employed with the amplifier 520, including a resistor 522 and matched zener diodes 524 and 526, connected in opposing relationship. The amplifier 500 presents a high input impedance, while accomplishing moderate limiting. The second stage 520, which has a lower input impedance, performs as a high quality limiter. The matched pairs of zener diodes 502 and 504, and 522 and 526, insure that the output of the limiter circuit includes no even harmonics, limiting the positive-going and negative-going half cycles equally.

The output of the amplifier 520 is connected to the input of band-pass filter 528. The band-pass filter 528 functions to produce, on eight output lines 532, signals individually responsive to recognition of touch tone signals present on the line 129.

Four outputs of the filter 528 are energized individually in response to recognition of coded tone frequencies within a high passband between 1209 and 1633 Hz., and the other four respond to frequencies within a lower passband between 699 and 941 Hz. Legitimate touch tone signals are indicated by the presence of a single signal in the high passband, and a single signal in the low passband. All of the output lines 532 are connected with identical circuits, so that only one of such circuits, viz., the one connected with the line 532a, need be described in detail.

The line 532a is connected to the noninverting input of an operational amplifier 534, which has its output connected to its inverting input by a line 536, to permit the amplifier 534 to operate as a buffer amplifier. Its output is rectified by means of a diode 538 connected in circuit with a resistor 540 and a capacitor 542. The capacitor 542 is charged in a negative direction in response to the amplitude of the signal present on the line 532a. The voltage on the capacitor 542 is permitted to bleed off gradually through a pair of resistors 544 and 546.

The junction of the resistors 544 and 546 is connected with the noninverting input of an amplifier 548, which functions as a Schmidt trigger. It has a feedback resistor 550 connected between its output and its noninverting input. Bias is supplied to its noninverting input through resistor 552 connected from a source of negative potential applied to a terminal 554. The output of the amplifier 548 is passed through a resistor 556 to one input of a 1-of-16 decoder unit 558. It is clamped by means of a clamping diode 560 to a source of positive potential applied to a terminal 562.

Figure 4:
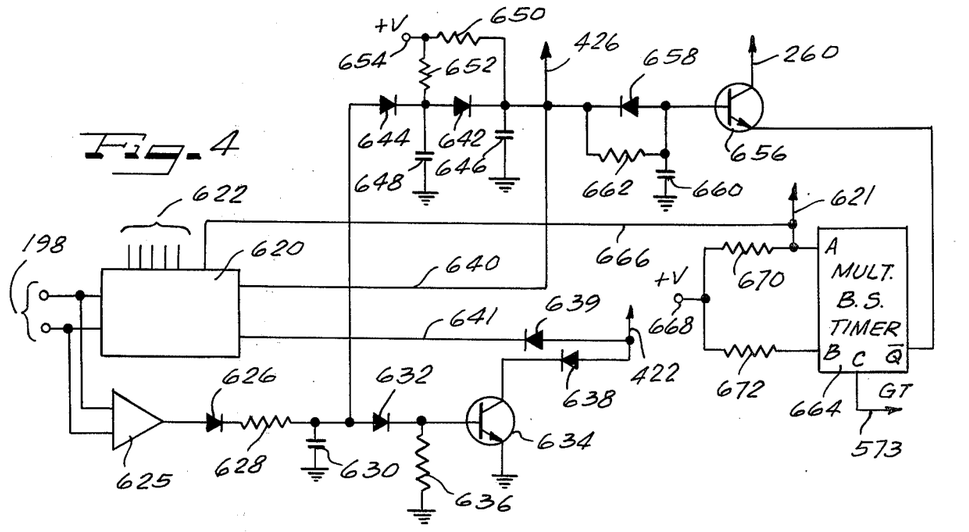
FIG. 4 is a schematic circuit diagram, partly in functional block diagram form, of another portion of the apparatus of FIG. 1, showing the dial decoder.

Three other ones of the outputs 532, which carry the signals received in the high passband, are connected to the other three inputs of the decoder 558 through identical circuits shown in FIG. 4 as blocks 533. An identical decoder 564 is provided for the four lines 532 which carry the signals received in the low passband, which signals are passed through individual circuits 533.

The decoders 558 and 564 function to energize one of sixteen output terminals in response to signals applied to the inputs thereof, which correspond to the binary representation of the sixteen outputs. Only four outputs of the decoder 558 are employed, however, corresponding to binary representations of 1, 2, 4 and 8, which are the four binary representations corresponding to a single bit on one of four input lines. Thus, one output of each of the units 558 and 564 is energized when one and only one input is energized. If, however, two or more of the input lines of either decoder are simultaneously energized, in response to a fault condition, for example, none of the four output lines of that decoder is energized. Thus, outputs exist on the respective output lines of the decoders 558 and 564 when one and only one of the four input lines of each is energized.

The four outputs of the decoder 558 and the four outputs of the decoder 564 are connected in unique combinations to the inputs of seven NOR gates 566, which produce output signals in response to the simultaneous occurrence of unique outputs of the decoders 558 and 564. They are respectively representative of 0, 2, 3, 4, 6, 7, and GT, and the output of each of the gates 566 is high when the indicated digit or the guard tone signal has been detected. The outputs of the gates 566 are made available at various points throughout the system, where they are required to execute the desired functions. The various functions performed by the several digits are as follows:

0: Call attendant at dictating machine location
2: Backspace, followed by review
3: Record
4: Stop
6: Correction mark
7: End of letter mark When a dial decoder is employed with the apparatus, it is preferably of the type described in the aforementioned Fish et al application, in which two additional digits are decoded. An "8" digit selects a multiple backspace function, equivalent to multiple operations of the "2" digit, and a "9" digit identifies that operation by a dial handset is desired. The dial decoder unit is not functional until a "9" digit is decoded, by the recognition of nine successive dial pulses. Thereafter, the "9" digit is nonfunctional. The multiple backspace function is not required when a touch tone handset is used, because the "2" button may be held depressed to generate as much backspacing as the operator desires, since after a backspace cycle, the "2" is immediately recognized when the relay coil 90 is deenergized, to initiate a further backspace cycle, if the "2" button is still held depressed.

Three of the NOR gates 566 are passed directly to the inputs of three inverters 568–570, and from there to outputs which are supplied elsewhere to the system. The NOR gate 566-6, which has a high level output when the "6" digit is decoded, is connected through the inverter 568 to an output line 571. The NOR gate 566-7 is connected through the inverter 569 to an output line 323. The NOR gate 566-GT, which is responsive to the recognition of a guard tone recorded by the dictating machine and recognized during playback, is connected through the inverter 570 to an output line 573.

The remaining four NOR gates 566 are connected individually to inputs of four NAND gates 580–583. The second inputs of each of the NAND gates 580–583 is supplied over a line 584. The signal supplied on the line 584 is referred to as a strobe pulse, and is furnished to ensure that false operation of the gates 580–583 does not occur in response to spurious signals which may be present on the transmission line. The outputs of the gates 580–583 and the inverters 568–570 are all provided with pull-up resistors 574 so that their outputs are all maintained high until energized.

The strobe pulse generator includes four input inverters 585–588 which are connected to the outputs of the NOR gates 566 for the digits 0, 2, 3, and 4, via lines 585-0, 586-2, 587-3, and 588-4, respectively. The outputs of the inverters 585–588 are wired together on an output line 590, which is connected through a circuit including a series resistor 592 and capacitor 594 to the A input of a monostable multivibrator 596, which functions as a continuity timer. The potential of the A input of the timer 596 is normally held at a high level by means of a resistor 598 connected to a source of positive potential at a terminal 600, and the B input is held at a high level by a resistor 601. A diode 602 connected in parallel with the resistor 598 clamps the positive-going peaks of the signal applied to the timer 596 to the potential present at the terminal 600. A pull-up resistor 591 is also provided for the line 590.

When any of the four input signals are present, which are connected to the four input inverters 585–588, the timer 596 is triggered into its quasi-stable state, and its $\overline{Q}$ output goes low. When the line 590 goes low, the line 105 is also forced low via a diode 601, to cut off the gate 102. The "6" and "7" signals also force the line 102 low, but do not trigger the timer 596, due to the diode 601.

The line 590 is also connected by resistor 604 and a diode 606 to a capacitor 608 connected from the diode 606 to ground. The circuit including the resistor 604 and the capacitor 608 functions as a delay circuit for slightly delaying the application of a negative voltage to the A input of a monostable multivibrator 610, to which the capacitor 608 is connected by a line 609. This input is normally held high by a resistor 612 connected to a source of positive potential at a terminal 614. The multivibrator 610 functions as a strobe pulse generator and is adapted to produce a positive pulse at its Q output and on a line 616 when its A input is low and its B input goes high. The $\overline{Q}$ output of the timer 596 is low when the timer is in its quasi-stable state, but goes high when the timer 596 resumes its normal state. If the low signal on the line 590 persists throughout this interval, the multivibrator 596 times out and produces a high signal at its $\overline{Q}$ output simultaneously with a low level signal on the line 609, triggering the pulse generator 610 and applying a pulse to the line 616. If the signal on the line 590 has not persisted this long, however, the signal on the line 609 has returned to a high level by the time the timer 596 times out, so that no strobe pulse on the line 616 is produced.

The period of the multivibrator 596 is 80 milliseconds, and the period of the multivibrator 610 is about 10 microseconds. The circuit including the multivibrators 596 and 610 functions as a continuity timer, producing a strobe pulse on the line 616 only if the detected signal on the line 590 has persisted longer than 80 milliseconds. The strobe pulse is applied via line 616 to the line 584, which is connected to enabling inputs of the NAND gates 580–583, so these gates produce outputs only when the strobe pulse appears, ensuring that no signal indicative of a "0," "2," "3," or "4" function is presented to the system unless such signal persists for a sufficient period of time to render it highly unlikely to be produced as a result of noise or the random frequency components of a message being recorded.

The signals for the "6" and "7" functions, the guard tone signals, are not strobed, because they are long-term functions. Both the "6" and "7" functions require the operation of a solenoid, and noise pulses which cause short-term outputs corresponding to the "6" or "7" digits do not persist long enough to actuate such solenoids. They could, however, be strobed in other situations, if desired.

The dial decoder unit 620 is illustrated in diagrammatic form in FIG. 4. When the dial decoder 620 is actuated, by detecting a "9" over the transmission line connected to the terminals 198, it is adapted to subsequently produce control signals on a plurality of output lines 622. These lines are connected in common with the outputs of the gates 580–583 and the outputs of the inverters 568–570.

An amplifier 625 (FIG. 4) is connected across the terminals 198, connected to the transmission line via the transformer 186 (FIG. 2). The output of the amplifier 625 is rectified by a circuit including a diode 626, a resistor 628, and a capacitor 630, the capacitor 630 being charged positively in accordance with the rectified value of the signal at the output of the amplifier 625. The capacitor 630 is connected through a diode 632 to the base of a transistor 634 and to ground through a resistor 636. The emitter of the transistor 634 is grounded, and its collector is connected through a diode 638 to the line 422. The line 422 is connected to the gate terminal of the FET 420, which is connected across the input of the amplifier 282 employed by the unit for playback purposes. Accordingly, whenever a signal is received at the terminals 198, playback operation of the system is inhibited so that playback of a strong signal does not interfere with the reception of a relatively weak control signal. In this way, control signals, in the form of pulses or touch tones, may be recognized by the system, even during the playback mode.

The line 422 is also connected through a diode 639 to an output of the dial decoder unit 620 via a line 641. The line 641 goes low whenever dial pulses are detected by the unit 620, so that playback is muted when dial pulses are recognized, even though the transistor 634 may not yet be conductive, because of the delay inherent in the circuit including the capacitor 630.

The dial decoder 620 has an input line 640 which is connected to the line 426 (FIG. 2) from the output of the NAND gate 78. When the lines 426 and 640 go low, as the gate 78 is de-actuated, the decoder 620 is disabled, thus preventing dial control pulses from reaching the system when the relay coil 90 is operated. The line 640 is connected to the capacitor 630 through a circuit including a pair of series connected diodes 642 and 644, a pair of capacitors 646 and 648, each connected from the cathode of one of the diodes to ground, and a pair of resistors 650 and 652, connected from the anodes of the diodes to a source of positive potential at a terminal 654. The circuit including the capacitors 646 and 648 function to discharge the capacitor 630 when the line 640 goes low, to prevent muting the playback amplifier 282. This enables the system to search for a guard tone after backspacing, without muting the guard tone.

The capacitor 630 continues to be held at a low level after the line 640 again goes high, for a period dependent upon the time constant of the circuit including the capacitors 646 and 648, which is adequate to maintain unmuted operation of the amplifier 282 after backspacing long enough to ensure that there is no guard tone present.

A low level on the line 426 also cuts off a transistor 656, which has its base connected to the line 426 through a diode 658 and to ground through a capacitor 660. A resistor 662 is connected in parallel with the diode 658 to form a dual time-constant circuit. The emitter of the transistor 656 is connected to the $\overline{Q}$ output of a multivibrator 664, which functions as a multiple backspace timer, and is triggered by a low level signal over a line 666, connected to its A input, when an "8" is recognized by the dial decoder 620. The A and B inputs are both connected to a source of positive potential at a terminal 668 via resistors 670 and 672, respectively.

When an "8" is recognized, the timer 664 is triggered, saturating the transistor 656, provided the line 426 remains high. The collector of the transistor 656 is connected to the line 260, which initiates a backspace function. This causes de-actuation of the gate 78, as described above in connection with the backspace function, which causes the line 426 to go low. This discharges the capacitor 660, and cuts off the transistor 656.

At the conclusion of backspacing, provided a guard tone is not detected, the line 426 goes high, and, after a short interval determined by the time constant of the circuit including the resistor 662 and the capacitor 660, again turns on the transistor 656, to produce another backspace pulse on the line 260. This continues until the timer 664 times out, after an interval of any desired length, but preferably about 60 seconds of machine running time. The clear input of the timer 664 is connected to the line 573, so if a guard tone is detected following any of the pulses produced by the transistor 656, the timer 664 is cleared, and the backspacing ends. This ensures that backspacing through the guard tone cannot occur.

FIG. 6 is a schematic circuit diagram of circuitry for interconnecting the apparatus of FIGS. 2-5 with a dictating machine. The circuit of FIG. 6 includes a number of transistors, interconnected with various points in the system thus far described, and providing five output terminals 691-695 for connection with the dictating machine for the functions of clutch, record, backspace, correction mark, and end-of-letter mark. Each output terminal 691-695 is connected with the collector of an associated transistor, so that current is drawn from the terminal when the associated transistor is conductive.

The output transistors are all npn transistors, and each npn transistor is driven by driver pnp transistor, the base of which is connected through a resistor to an input line. The line 222 (from the $\overline{Q}$ output of the flip-flop 220) is connected through a resistor 696 to the base of a transistor 698, the collector of which is connected through a resistor 700 to the base of an output transistor 702. The collector of the output transistor 702 is connected to the terminal 691, and its emitter is connected to a source of negative potential at a terminal 704. A resistor 706 is connected between a base and emitter of the transistor 702 for biasing purposes, and a resistor 708 is connected from a source of positive potential at a terminal 710 to the base of the transistor 698 for biasing purposes.

The emitter of the transistor 698 is connected to a terminal 712, which is selectively connected either to a terminal 714 or to a terminal 716. The terminal 716 is connected with the source of positive potential at the terminal 710, and the terminal 714 is connected to the line 268, which is connected from the $\overline{Q}$ output of the backspace timer 264 (FIG. 3). The $\overline{Q}$ output of the timer 264 goes low during a backspace function, and when the terminal 712 is connected to the terminal 714, the transistor 698 is cut off during this interval. This cuts off the transistor 702 so that no current is drawn from the terminal 691 during a backspacing interval. When the terminal 712 is connected to the terminal 716, however, backspacing does not affect the operation of the transistor 702. The terminal 712 is connected to either the terminal 714 or the terminal 716, in accordance with the requirements of the specific dictating machine being used.

The line 140, from the record flip-flop 138 (FIG. 3) is connected through a resistor 718 to the base of a pnp transistor 720, the emitter of which is connected to the terminal 716 and the collector of which is connected through a resistor 722 to the base of an npn transistor 724. The collector of the transistor 724 is connected to the terminal 692. When a low level appears on the line 140, the transistors 720 and 724 are driven into conduction, and current is drawn from the line 692, causing the dictating machine connected thereto to execute its record function.

The remaining circuitry of FIG. 6 is identical to that which has been described above, with the line 268 connected through a pair of transistors to the terminal 693, the line 571 connected through a pair of transistors to the terminal 694, and the line 323 connected through a pair of transistors to the terminal 695. The terminals 691-695 are connected by means of the wires 18 (FIG. 1) with the dictating machine. Each is connected to ground through a diode 730, which effectively clamps the high level of each of the output terminals to ground. The npn transistors associated with the nonstrobed signals are each provided with a capacitor 731, which functions to slightly delay operation of these transistors, to increase their noise immunity.

Figure 7:
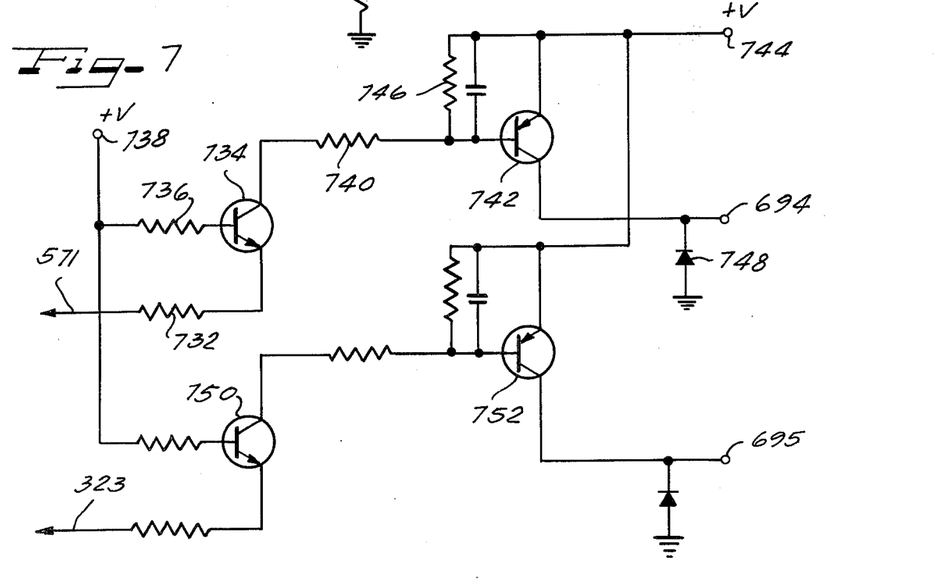
FIG. 7 is a schematic circuit diagram of an alternative output system.

Referring now to FIG. 7, a portion of an alternate circuit is illustrated, which is adapted for use with dictating machines having positive power supplies rather than a negative power supply. Only two of the five input lines of FIG. 6 are illustrated, and each is connected through a pair of transistors to a pair of corresponding output terminals. The input line 571 is connected through a resistor 732 to the emitter of an npn transistor 734, the base of which is connected through a resistor 736 to a source of positive potential at a terminal 738. The collector of the transistor 734 is connected through a resistor 740 to the base of a pnp transistor 742, the emitter of which is connected to a source of a positive potential at a terminal 744, and the collector of which is connected to the output terminal 694. A resistor 746 is connected between the base and emitter of the transistor 742 for biasing. A diode 748 is connected from the output terminal 694 to ground, to clamp the most negative portion of the output signal to ground.

An identical circuit incorporating an npn transistor 750 and a pnp transistor 752 is interconnected between the line 323 and the output terminal 695. The three other circuits of FIG. 6, although not specifically illustrated in FIG. 7, are identical to the circuits shown. Either the circuit of FIG. 6 or the circuit of FIG. 7 is employed with the apparatus of the present invention, in accordance with the requirements of the dictating machine which is to be used.

Another change, which also may optionally be made, depending upon the dictating machine employed, is the connection to the B input of the call-attendant pulse generator 390 (FIG. 3). The B input is shown connected to a terminal 760, which may be connected either to a terminal 762, and thence to the line 392, or to a terminal 764, connected through a resistor 766 to a source of positive potential at a terminal 768. If the terminal 760 is connected to the terminal 764, the input remains at a high level, so that the pulse generator 390 is always conditioned for operation in response to a low level signal presented to its A input. When the terminal 760 is connected to the terminal 762, however, the pulse generator 390 may not be retriggered by successive low level signals applied to an input, so that it is permitted to time out following triggering by the first low level signal applied to the A input. The terminal 760 may be connected optionally in either way, as desired.

Figures 8, 9, 10:
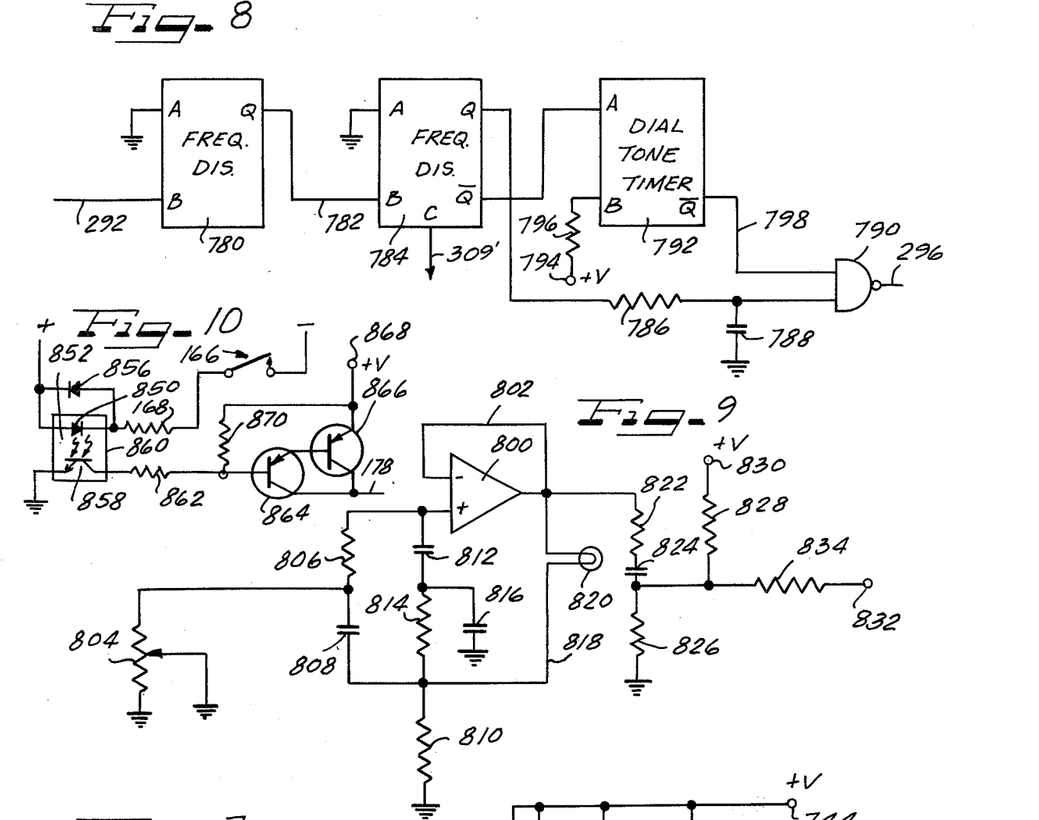
FIG. 8 is a functional block diagram of a dial tone detector employed with the apparatus of FIG. 2.
FIG. 9 is a schematic circuit diagram of one of several oscillators employed with the apparatus of FIG. 3.
FIG. 10 is a schematic circuit diagram of an alternative means for sensing a disconnect pulse and initiating a disconnect sequence.

Referring now to FIG. 8, a functional block diagram of the dial tone detector is illustrated. The line 292 is connected to the input of a monostable multivibrator 780, the A input of which is grounded. The Q output of the multivibrator 780 is connected to the B input of a monostable multivibrator 784, the A input of which is also grounded, and the clear input of which is connected to the line 309. The Q output of the multivibrator 784 is connected through a circuit including a resistor 786 and a capacitor 788 to one input of a NAND gate 790. The $\overline{Q}$ output of the multivibrator 784 is connected to the A input of a further monostable multivibrator 792, the B input of which is connected to a source of positive potential at a terminal 794 by a resistor 796. The $\overline{Q}$ output of the multivibrator 792 is connected by a line 798 to the other input of the gate 790, and the output line 296 is energized in response to operation of the gate 790.

The multivibrators 780 and 784 both function as frequency discriminators. If the rate of zero-crossings of the signal on the line 292 is greater than 500 Hz., the multivibrator 780 will be continually retriggered by each positive-going zero-crossing before it times out. If the frequency of the signal on the line 292 is less than 500 Hz., however, the multivibrator 780 times out each time it is triggered by a positive-going zero-crossing, and a series of pulses are presented to the line 782. The multivibrator 780 therefore acts as a discriminator to screen out frequencies greater than 500 Hz., and to cause a series of pulses to be presented to the line 782 when the frequency of the signal on the line 292 is less than 500 Hz.

The multivibrator 784 has a different time period, such that it is able to retrigger as long as the pulse repetition rate of the pulses on the line 782 is greater than 125 Hz. If the pulse repetition rate is less than this, the multivibrator 784 is able to time out, so that a series of pulses are presented to its output.

When the $\overline{Q}$ output of the multivibrator 784 goes low for the first time, the multivibrator 792 is triggered for a period of three seconds, after which its $\overline{Q}$ output goes high, to enable the gate 790. If at that time the other input of the gate 790 is high, indicating that the multivibrator 784 has timed out, the gate 780 is actuated and a low level signal is produced on the line 296.

The circuit including the resistor 786 and the capacitor 788 functions as a delay circuit, to prevent the gate 790 from being actuated prior to triggering of the multivibrator 792.

In FIG. 9, a schematic circuit diagram of one of the oscillators 119 and 120 is illustrated. The oscillator incorporates an operational amplifier 800, having a feedback connection 802 between its output and its inverting input, and a frequency-determining network connected to its noninverting input. The network includes a potentiometer 804 connected to the junction of a series connected resistor 806 and capacitor 808. The other end of the resistor 806 is connected to the noninverting input of the amplifier 800 and the other end of the capacitor 808 is connected through a resistor 810 to the ground. A series circuit including a capacitor 812 and a resistor 814 is connected in parallel with the circuit including the resistor 806 and the capacitor 808, and the junction of the capacitor 812 and resistor 814 is connected to ground through a capacitor 816.

The junction between the capacitor 808 and the resistor 810 is connected by a line 818 through a lamp 820 to the output of the amplifier 800. Its output is also connected through a resistor 822, a capacitor 824, and a resistor 826 to ground, the junction between the capacitor 824 and the resistor 826 being normally maintained at a high level by means of a resistor 828 connected therefrom to a source of positive potential at a terminal 830. The output of the oscillator is available at a terminal 832 connected by a resistor 834 to the junction of the capacitor 824 and the resistor 826. The frequency of the oscillator of FIG. 9 is determined by the time constant of the circuit connected through its noninverting input, and this is variable by adjustment of the potentiometer 804. In this manner, the two frequency components of the guard tone may be accurately adjusted, so that they can be detected by means of the touch tone detector described in connection with FIG. 5.

All of the monostable multivibrators employed in the apparatus of the present invention are preferably of the type commercially available as Texas Instruments Model SN 74123. The period determining elements for such multivibrators have not been shown, except for the timer 208, but they are understood to be connected in the customary manner in order to obtain the appropriate time intervals for each of the multivibrators. As is conventional, diodes are used with the frequency determining circuits so as to avoid placing a reverse voltage on electrolytic capacitors, and when the clear input of the multivibrator is employed.

The 1-of-16 decoders 558 and 564 are preferably of the type commercially available as Texas Instruments SN 7442. The analog gates 102, 110, 116, and 394 are preferably of the type commercially available as RCA model No. CD4016. All of the other components are also standard components which are commercially available.

In the foregoing description, the term handset has been used to refer to the apparatus by which control signals and pulses are generated to regulate operation of the control unit of the present invention. It will be understood to those skilled in the art that, in many models of telephone instruments, an essential part of the controlling apparatus is located in the base or cradle member, which supports the hand-held unit when the latter is not in use. The term handset as used herein encompasses the apparatus within the base member which is needed to produce the required signals. Also, in term VOR is used in the foregoing not in its literal sense, but instead in the sense of a device which responds to the presence of any signal above a given threshold level, whether or not a relay or its equivalent is used.

Referring now to FIG. 10, an alternative disconnect circuit is illustrated, which may be substituted for the relay coil 170 (FIG. 2) and its contacts, if desired. The contacts 166 and resistor 168 are the same as those shown in FIG. 2, and a light-emitting diode (LED) 850 of a photon coupler circuit 852 is substituted therefor. A diode 856 is connected in parallel with the LED 850. A phototransistor 858 is optically coupled to the LED 850, and shielded from ambient light by a shield 860. The emitter of the transistor 858 is grounded, and its collector is connected through a resistor 862 to the input of a Darlington circuit incorporating two pnp transistors 864 and 866. Bias is supplied from a source of positive potential at a terminal 868 through a resistor 870 to the input of the Darlington circuit, and the terminal 868 is connected to the emitter to the output transistor of the circuit. The collectors of both transistors are connected in common to the line 178.

The photon coupler circuit 852 has a very fast response time, so that a very short opening of the transmission line circuit or a short pulse of the opposite polarity is effective to produce a low level on the line 178, which is connected to the A input of the disconnect pulse generator 146 to initiate the disconnect sequence. The circuit of FIG. 10 is effective when the apparatus of the present invention is employed with internally connected systems such as PBX systems, where a short disconnect pulse of opposite polarity is generated on hang up of the calling handset.

It will be apparent to those skilled in the art that, although the present invention has been specifically described in terms of a control unit for a dictating machine, it is readily adaptable to the control of other devices. For example, instead of connecting the output lines 691–695 to a dictating machine, they may instead be connected to control on-off switches or other controls for other equipment, and the condition of such equipment can be monitered over a telephone line by use of a signalling system similar to that described in connection with the pick up coil 376.

It will be appreciated by those skilled in the art that the apparatus of the present invention uses modular construction, especially in the extensive use of monostable multivibrators which do not require any external clock pulses or the like, and which can be selectively made retriggerable or nonretriggerable in response to signals present at its inputs. The arrangement of the components of the present invention is such that the functional operation of the system can readily be modified simply by changing a few connections which are readily accessible. Some such modifications have been described with reference to FIGS. 3, 6, and 7, and others will be readily apparent to those skilled in the art.

What is claimed is:

1. A dictating machine control unit adapted to control operation of a dictating machine connected therewith, said control unit comprising ring detector means for detecting a ringing condition on a telephone transmission line, generating means responsive to said ring detector means for generating a guard tone for a predetermined time interval, recording means responsive to said generating means for recording said guard tone on the recording medium of the dictating machine, means operative subsequent to the generation of said guard tone for receiving signals from said transmission line and recording them on said recording medium, first means responsive to control signals generated by a coded tone handset and transmitted over said transmission line for causing said dictating machine to execute an operational function, and second means responsive to control signals generated by a dial type handset and transmitted over said transmission line for causing said dictating machine to execute an operational function.

2. Apparatus according to claim 1, including detector means operatively associated with said dictating machine for detecting when the recording medium of said dictating machine is exhausted, and means for producing an audible signal on said transmission line in response to detection of said recording medium being exhausted.

3. Apparatus according to claim 2, including a bistable device, said bistable device normally being in one of its two stable states, and means connecting said bistable device with said detector means for setting said bistable device to its other state in response to detection of said recording medium being exhausted.

4. Apparatus according to claim 1, wherein said means for generating a guard tone comprises first and second oscillators for generating signals having frequencies equal to two different touch tone frequencies.

* * * * *